United States Patent

Darbey

(10) Patent No.: US 11,360,974 B2
(45) Date of Patent: Jun. 14, 2022

(54) ONTOLOGY DRIVEN CROWD SOURCED MULTI-DIMENSIONAL QUESTION-ANSWER PROCESSING FOR AUTOMATED BID PROCESSING FOR RAPID BID SUBMISSION AND WIN RATE ENHANCEMENT

(71) Applicant: Bidify Ltd., Buckinghamshire (GB)

(72) Inventor: Jonathan Darbey, Buckinghamshire (GB)

(73) Assignee: Responsify Ltd., Marlow (GB)

( * ) Notice: Subject to any disclaimer, the term of this patent is extended or adjusted under 35 U.S.C. 154(b) by 293 days.

(21) Appl. No.: 16/699,480

(22) Filed: Nov. 29, 2019

(65) Prior Publication Data

US 2021/0165792 A1 Jun. 3, 2021

(51) Int. Cl.
*G06F 16/2452* (2019.01)
*G06F 16/23* (2019.01)
*G06Q 10/10* (2012.01)

(52) U.S. Cl.
CPC .... *G06F 16/24522* (2019.01); *G06F 16/2365* (2019.01); *G06Q 10/10* (2013.01)

(58) Field of Classification Search
CPC .............. G06F 16/24522; G06F 16/2365
See application file for complete search history.

(56) References Cited

U.S. PATENT DOCUMENTS

| | | | |
|---|---|---|---|
| 2011/0246254 A1* | 10/2011 | Johnson | G06Q 40/04 707/804 |
| 2013/0103690 A1 | 4/2013 | Arnold et al. | |
| 2018/0060780 A1 | 3/2018 | Kilmartin et al. | |
| 2018/0232443 A1 | 8/2018 | Delgo et al. | |
| 2018/0322121 A1* | 11/2018 | Barker | G06N 5/022 |

* cited by examiner

*Primary Examiner* — Van H Oberly
(74) *Attorney, Agent, or Firm* — CRGO Global; Steven M. Greenberg

(57) ABSTRACT

A method for crowdsourced answer selection for question-answer processing in automated commercial tender document (CTD) response generation includes populating a database with questions extracted from past CTDs and clustering the questions into groups of similar questions. Then, for each of the genus questions, a set of answers submitted in respectively different responses by multiple different responders are mapped to different ones of the past CTDs in connection with the genus question. Thereafter, the responses are rated and a present response document for a present CTD and also the present CTD are loaded into an editor. A question is extracted from the present CTD and the database queried with the extracted question. In response, a set of answers mapped to a genus question for the extracted question is retrieved and an answer in the set having a highest rating is inserted into the present response document for the extracted question.

12 Claims, 2 Drawing Sheets

ONTOLOGY DRIVEN CROWD SOURCED MULTI-DIMENSIONAL QUESTION-ANSWER PROCESSING FOR AUTOMATED BID PROCESSING FOR RAPID BID SUBMISSION AND WIN RATE ENHANCEMENT

BACKGROUND OF THE INVENTION

Field of the Invention

The present invention relates to the field of commercial tender processing and more particularly, to the automated processing of commercial tender documentation.

Description of the Related Art

Commercial tender documentation refers to the core set of commercial documents used in commerce for the procurement of goods or services. Standard commercial tender documentation ranges from a request for tender (RFT) or invitation to bid (ITB) when the nature of the goods or services to be procured is well understood, to a request for proposal (RFP) when the nature of the goods or services to be procured is less clear. In all cases, the essential structure of commercial tender documentation includes a set of questions, required to be answered by a prospective respondent. In some instances, the questions are organized in a structurally sensible manner. But, in other instances, the questions lack sufficient organization.

The process of responding to a commercial tender involves identifying each question within a commercial tender document, and formulating a written response. The written response, then, may be compared to other written responses so that the requestor may award one of the respondents with a resulting procurement contract, or so that the requestor may offer one or more of the respondents with a follow-on tender request such as a request for information (RFI) or request for quotation (RFQ). In either circumstance, the exercise of responding to a commercial tender tends to be a manual exercise that repeats itself for each commercial tender.

Recognizing the repetitive nature of responding to a commercial tender, software providers in the past have proposed automated and semi-automated tools facilitating the generation of a response to a commercial tender. Typical solutions focus on the RFP response process and rely upon a centralized repository of corporate information from which standardized answers to RFP questions may be selected and inserted into a templated response to an RFP, either manually, automatically, or in most cases, a combination of both. Some of solutions permit the tagging of answers with meta-data to facilitate the organization of pre-constructed answer content, readily accessible by the end user. In fact, some solutions go so far as to classify the recency or freshness of answer content so as to ensure the use of the most recent answer content in a response to an RFP.

However, in all instances, RFP response management solutions focus only on a repository of past used answers to questions without regard to the context of the questions asked and more specifically, the context of the RFP itself. Plainly, the best supplied answer to a question depends upon the context of the RFP. But, modern automated RFP solutions do not account for the context of the RFP. As well, while sets of questions of an RFP may appear to be different, resulting in an automated solution providing an answer mapping to the specific question presented, many questions may be semantically identical despite the use of different words. In this instance, a wide range of otherwise viable answers will be excluded from use in selecting an appropriate answer. Finally, while modern RFP response management tools select answers presented from past responses to RFPs, no consideration is provided as to the individual likelihood of success for each answer selected.

BRIEF SUMMARY OF THE INVENTION

Embodiments of the present invention address deficiencies of the art in respect to the automated generation of a response document for a commercial tender document (CTD) and provide a novel and non-obvious method, system and computer program product for crowd-sourced question identification within a CTD. In an embodiment of the invention, a method for crowdsourced answer selection for question-answer processing in automated CTD response generation includes populating a database of a computer with different questions extracted from different past CTDs and clustering the different questions into groups of similar questions. The clustering is performed by natural language processing each of the different questions, grouping ones of the questions that are semantically similar, and forming a genus question for each grouping of semantically similar questions.

Then, for each of the genus questions, a set of answers submitted in respectively different responses by multiple different responders are mapped to different ones of the past CTDs in connection with the genus question. Thereafter, the responses are rated in the database and a present response document for a present CTD and also the present CTD are loaded into an editor in memory of the computer. A question is then extracted from the present CTD and the database is queried with the extracted question. In response, different ones of the mapped set of answers mapped to a genus question for the extracted question are retrieved. The editor then inserts into the present response document in connection with the extracted question, one of different ones of the mapped set of answers having a highest rating amongst the mapped set of answers mapped to the genus question for extracted question. In this way, only the answer most likely to lead to a favorable outcome in the submission of the response to the present CTD is included in the response to the CTD.

In one aspect of the embodiment, the method additionally includes receiving as input in the editor, an indication of success of the present CTD and adjusting ratings in the database for each one of the mapped set of answers inserted into the present response document to reflect the indication of success, such as a win-loss metric indicating, for all of the past CTDs, a probability of success in winning a bid utilizing the one of the mapped set of answers. In another aspect of the embodiment, the method additionally includes receiving as input outside of the editor, an indication of success of one of the mapped set of answers inserted into the present response document, and adjusting corresponding ratings in the database for the one of the mapped set of answers inserted to reflect the indication of success. In even yet another aspect of the embodiment, the method additionally includes parsing the present response document to compute document metrics, comparing the document metrics of the present response document to model metrics associated with a known win outcome, identifying a threshold deficiency in one of the document metrics relative to the model metrics, and displaying a prompt in the editor with the identified threshold deficiency.

In another embodiment of the invention, a computer data processing system is configured for crowdsourced answer selection for question-answer processing in automated CTD response generation. The system includes a host computing system that includes one or more computers, each with memory and at least one processor. The system also includes a data store coupled to the computing system and storing therein a multiplicity of different CTDs received from over a computer communications network from different computing clients from different individuals, and also different questions extracted from different ones of the CTDs. Finally, the system includes an answer selection module.

The module includes computer program instructions executing in the memory of the host computing system. The program instructions, during execution, cluster the different questions into groups of similar questions by natural language processing each of the different questions, grouping ones of the questions that are semantically similar, forming a genus question for each grouping of semantically similar questions. Then, for each of the genus questions, the program instructions map a set of answers submitted in respectively different responses by multiple different responders to different ones of the past CTDs in connection with the genus question, rate the responses in the data store, load into an editor in the memory of the host computing system, a present response document for a present CTD and also the present CTD, and extract a question from the present CTD. The program instructions yet further query the data store with the extracted question and retrieve in response, different ones of the mapped set of answers mapped to a genus question for the extracted question. Finally, the program instructions insert into the present response document in connection with the extracted question, one of different ones of the mapped set of answers having a highest rating amongst the mapped set of answers mapped to the genus question for extracted question.

In one aspect of the embodiment, the extracted question of the present CTD is then clustered with other questions similar to one another in the database. In this way, a mapping is then maintained with respect to the newly extracted question of the present CTD for subsequently encountered similar questions in subsequently received CTDs. The result is an ever expanding database of questions mapped to answers whose respective ratings constantly adjust according to perceived contributions to the success of responses to corresponding CTDs. In another aspect of the embodiment, each answer mapped to a genus question for an extracted question may be rated based upon the indication of success provided in connection with the submission of responses to past CTDs, but also each answer mapped to a genus question for an extracted answer may be rated based upon a subjective rating provided through the user interface by a recipient of a response to a corresponding one of the CTDs issued by the recipient.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for crowdsourced answer selection for question-answer processing in automated CTD response generation. In accordance with an embodiment of the invention, a CTD for an opportunity is received and loaded into a user interface of a response editor along with a templated response document. Each question in the CTD is identified and generalized for matching to a pre-stored form of the question. Amongst a set of answers associated with each matched pre-stored form of the question, a highest ranking one in each set is selected for inclusion in the response document as an answer to the identified question. Thereafter, all of the ratings for corresponding selected answers included in the response document are adjusted upwardly to the extent that the response document results in a closed-won state of the opportunity, whereas the ratings for the corresponding selected answers included in the response document are adjusted downwardly to the extent that the response document results in a closed-lost state of the opportunity. In this way, the dynamic adjustment of the ratings results in the use of answers known to achieve the highest rate of success as measured contemporaneously.

Figure 1:
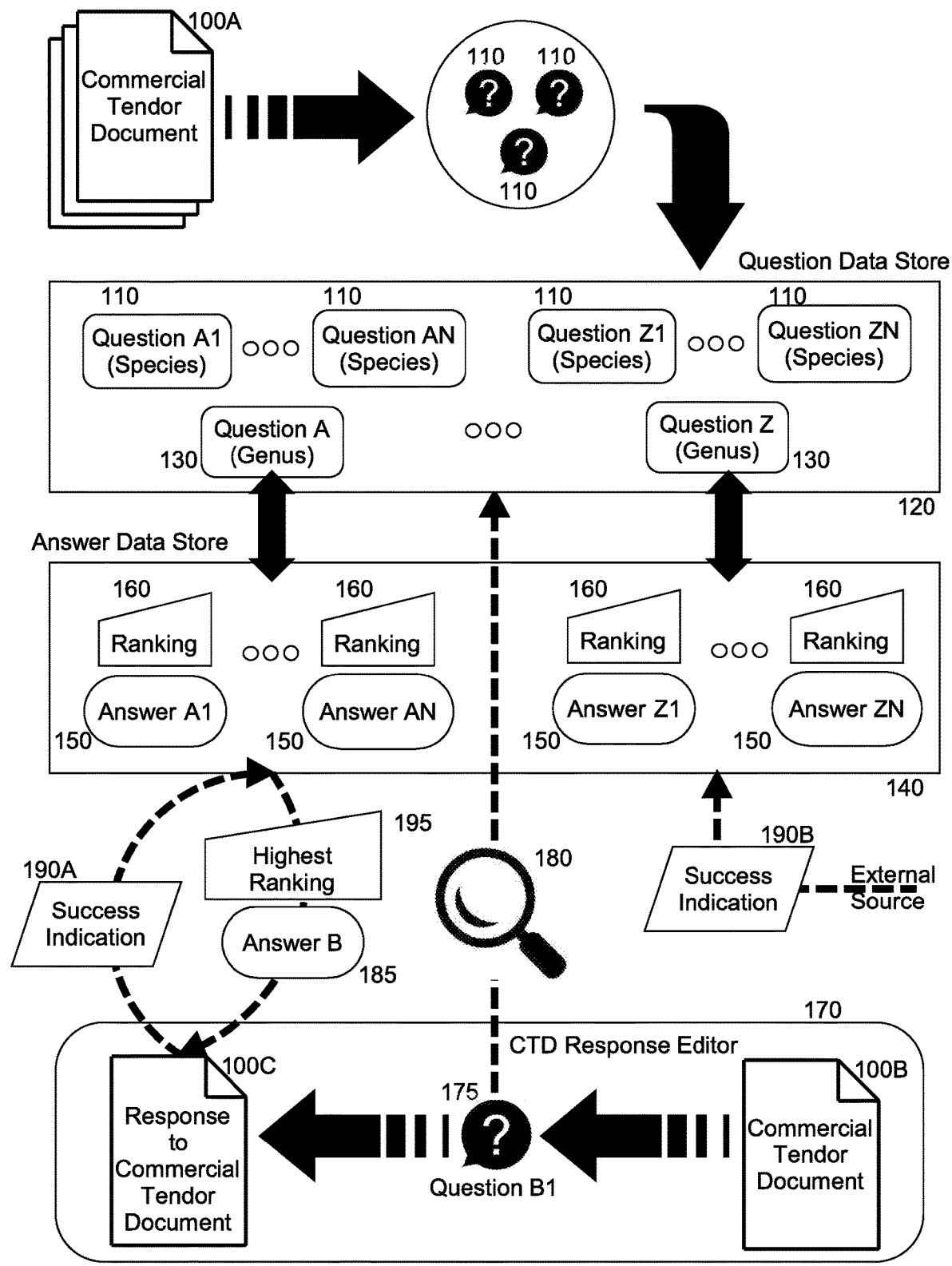
FIG. 1 is a pictorial illustration of a process for crowdsourced answer selection for question-answer processing in automated CTD response generation.

In further illustration, FIG. 1 pictorially shows a process for crowdsourced answer selection for question-answer processing in automated CTD response generation. As shown in FIG. 1, different CTDs 100A are received and questions 110 extracted therefrom. The questions 110 placed into a question data store 120 and are classified therein according to a question genus 130 so that the different text of different clusters of the questions 110 simplify to the same genus question 130. In this regard, each of the questions 110 can be subjected to natural language processing to identify a semantic meaning for each of the questions 110 resulting in a genus question 130 common to different sets of the questions 110. Thereafter, different answers 150 are defined in an answer data store 140 for each of the genus questions 130 and for at least one of the genus questions 130 multiple answers 150 are defined. Of note, a ranking 160 is assigned to each of the answers 150 based upon the presence of a corresponding one of the answers 150 in a response document known to have been successful, or based upon the presence of a corresponding one of the answers 150 in a response document known to not have been successful.

Thereafter, a contemporaneous CTD 100B is received for processing in a CTD response editor 170 and a response document 100C is generated for the contemporaneous CTD 100B. For instance, the response document 100C can be generated as a previously defined template for a response associated with the contemporaneous CTD 100B, or a classification assigned to the contemporaneous CTD 100B. In any event, a question 175 is extracted from the CTD 100B. The question 175 is reduced through natural language processing into a semantic equivalent and used in a query 180 to the question database 120 to locate a matching one of the genus questions 130. Upon locating a matching one of the genus questions 130, a corresponding set of the answers 150 mapped to the matching one of the genus questions 130 is selected and a particular one of the answers 185 in the set is selected having a highest associated ranking 195 for inclusion as an answer to the question 175 in the response document 100C. The process can repeat for additional questions 175 extracted from the contemporaneous CTD 100C.

Subsequent to the completion of the response document 100C, a success determination 190A, 190B of the success of the response document 100C is provided to the answer data store 140 so as to upwardly modify each of the rankings 160 for ones of the answers 150 included in the response document 100C. Conversely, each of the rankings 160 for ones of the answers 150 included in the response document 100C are modified downwardly in response to a determination of an unsuccessful outcome for the response document 100C. The success indication 190A, 190B may be provided internally within the CTD response editor 170, or externally from the CTD response editor 170. Optionally, each of the rankings 160 may reflect a composition of the win-loss ratio of all responses to all of the CTDs 100A in which a corresponding one of the answers 150 had been included.

Figure 2:
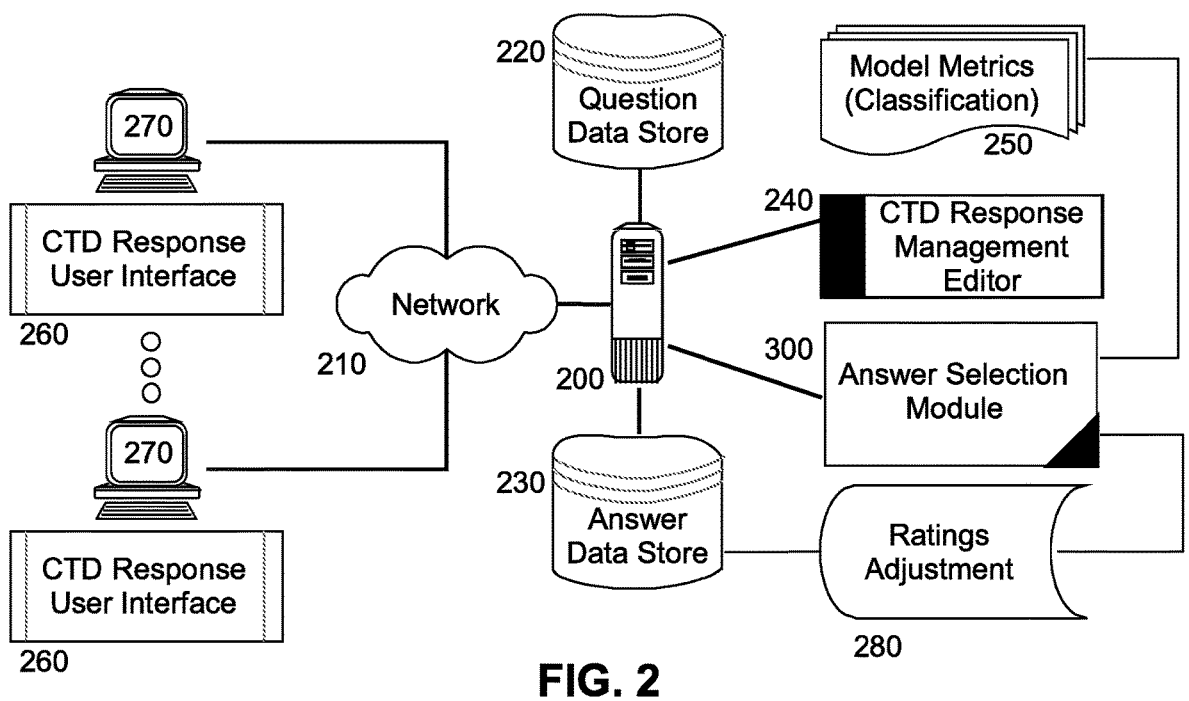
FIG. 2 is a schematic illustration of a computer data processing system adapted for crowdsourced answer selection for question-answer processing in automated CTD response generation; and, FIG. 3 is a flow chart illustrating a process for crowdsourced answer selection for question-answer processing in automated CTD response generation.

The process described in connection with FIG. 1 may be implemented within a computer data processing system. In further illustration, FIG. 2 schematically shows a computer data processing system adapted for crowdsourced answer selection for question-answer processing in automated CTD response generation. The system includes a host computing system 200. The host computing system 200 includes one or more computers, each with memory and at least one processor. A CTD response management editor 240 executes in the memory of the host computing platform 200 and provides automated management of the generation of response documents to different CTDs. Different end users access the CTD response management editor 240 from over computer communications network 210 through respectively different user interfaces 260 provided in respectively different client computing devices 260.

Of note, the CTD response management editor 240 facilitates the assembly of a response document to a received CTD by loading in the CTD response management editor 240 a templated response document corresponding to the received CTD, identifying questions in the CTD, and mapping the identified questions similar or identical questions stored in question data store 220 to corresponding answers stored in answer data store 230 while inserting the mapped answers into the response document in connection with the corresponding questions. More particularly, an answer selection module 300 is coupled to the CTD response management editor 240 and facilitates the answering of each question in the received CTD.

To that end, the answer selection module 300 includes computer program instructions that when executed by the processor of the host computing system 200, are enabled to extract different questions in a received CTD and to generalize each of the extracted questions to a semantically simplified form. The program instructions additionally are enabled to query the question data store 220 with the semantically simplified form for each extracted question in order to locate a matching genus question and then to a set of mapped answers for the genus question within the answer data store 230. The program instructions yet further are enabled to select from amongst each set of answers, a most highly rated one of the answers in the set. Finally, the program instructions are enabled to insert into the response document in the CTD response management editor 240, each selected answer as an answer to a corresponding extracted question.

Importantly, the ratings for each stored answer may be adjusted periodically and dynamically. Specifically, ratings adjustment logic 280 adjunct to the answer selection module 300, includes program code that continuously receives success data in connection with different answers, different responses to CTDs, or both. The success data may be received from other authors of other responses to respective CTDs, or the success data may be received from issuers of the CTDs. For each answer associated with a received indication of success, the rating is increased. Likewise, for each answer associated with receiving indication of non-success, the rating is decreased. As well, for each response to a CTD indicated to be successful, the rating for each answer included therein is increased. Conversely, for each response to a CTD indicated to be unsuccessful, the rating for each answer included therein is decreased. Finally, the rating may be a expressed as a percentage reflecting a percentage of successful responses to CTDs in which a corresponding answer is included compared to all responses successful and otherwise in which the corresponding answer is included.

Optionally, the CTD response management editor 240 may provide additional guidance in the formulation of a response to a CTD. In this regard, the response once formulated can be inspected for different response document metrics such as the use of a particular font, font size, font color, margin, heading, background color, number of words, number of pages, and the like. To that end, metrics for an optimal model 250 associated with a classification that is common to the CTD and the model (such as industrial classification) is retrieved and compared to the different response document metrics. To the extent that the different response document metrics differ from the model, the disparity in metrics between the model and the CTD are displayed in the CTD response management editor 240 so as to encourage the end user to modify the response document metrics.

More particularly, the document metrics further can include section-based values such a presence of particular document sections of the response including an introductory section, a section regarding a methodology and a section describing pertinent personnel, to name a few examples. The foregoing is thus useful in ensuring the presence in the response document of content sections most closely associated with the previous success of other response documents. To that end, as the response document is generated from the templated response document in response to a CTD, a classification of the CTD is determined and a set of pre-determined sections of the document are retrieved in respect to the classification. Then, the response document is processed to identify the different existing sections in the document, for example based upon an analysis of different headings of the response document and a natural language processing of the headings to identify sections.

The existing sections of the document are then compared to the pre-determined sections in order to identify missing sections, which missing sections are then proposed in a prompt of the display of the CTD response management editor 240 so as to encourage the end user to modify the response document to include both the missing sections and also answers to the missing sections. Of additional note, the pre-determined sections for each classification of CTD may be dynamically augmented as a correlation, in the success date, between successful submissions of responses to the classified CTD and sections present in the response to the classified CTD are determined. In this way, a known successful combination of sections in a response document may be crowd-sourced as part of the success data from past submissions of response documents by different organizations.

Figure 3:
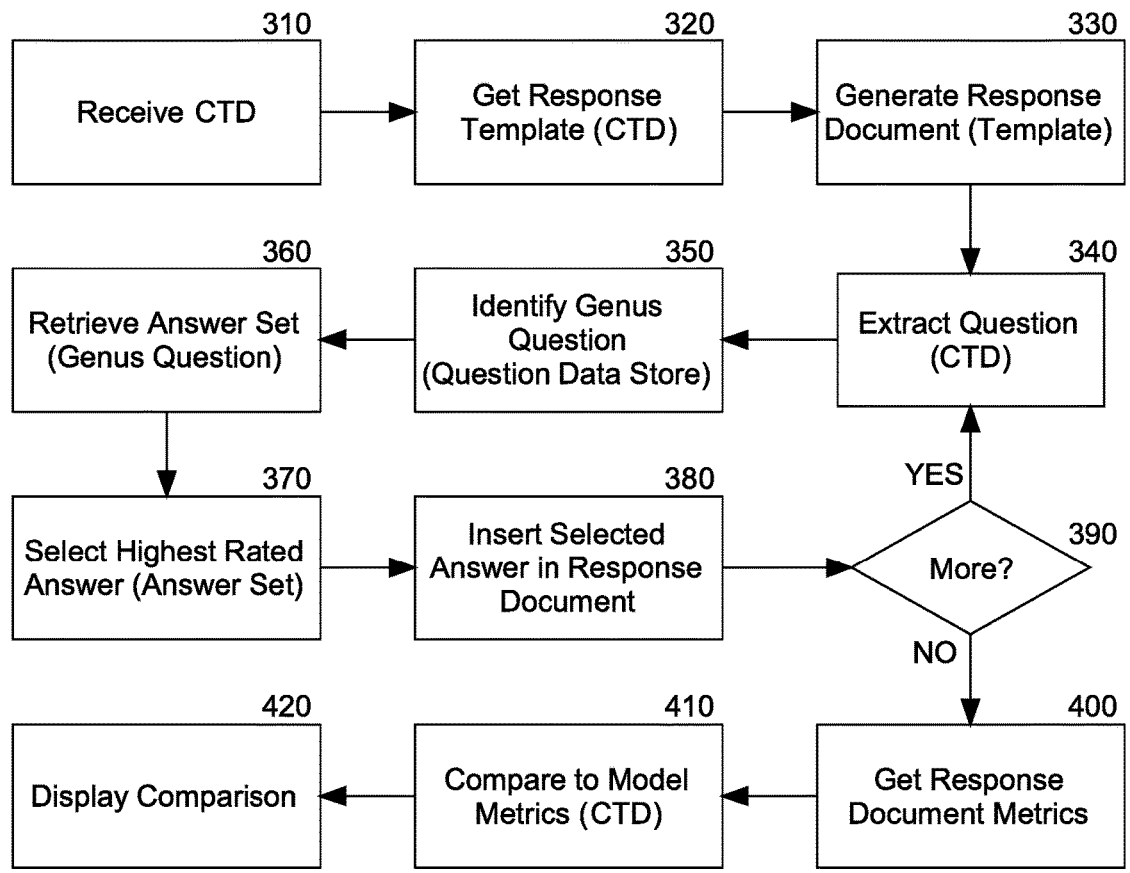

In even yet further illustration of the operation of the answer selection module 300, FIG. 3 is a flow chart illustrating a process for crowdsourced answer selection for question-answer processing in automated CTD response generation. Beginning in block 310, a CTD is received and in block 320, a response template for the CTD is selected and in block 330, a response document generated in the CTD response management editor based upon the template. In block 340, a first question is extracted from the CTD. In block 350, a genus question is determined for the extracted question for instance through automated text simplification and then a similarity analysis is performed between the genus question resulting from text simplification and a genus question in the question data store. Thereafter, in block 360, a mapped set of answers to the genus question in the answer data store is retrieved.

In block 370, a highest rated one of the answers in the set is selected. Then, in block 380, the highest rated one of the answers that has been selected is inserted into the response document as an answer to the extracted question. Finally, in decision block 390, if additional questions remain to be processed in the CTD, the process returns to block 340 with the extraction of a next question. When no further questions remain to be processed in the CTD, optionally in block 400 metrics of the response document are determined, such as a number of pages, background or foreground color, proportion of imagery to text, font, font size or font color or headings, to name only a few examples. Then, in block 410 the metrics of the response document are compared to metrics for a model document associated with a classification of the CTD such as a particular industry. Finally, in block 420, the comparison is displayed in the CTD response management editor so that the end user can modify the metrics of the response document to further the probability of a successful outcome to the response document.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

I claim:

1. A method for crowdsourced answer selection for question-answer processing in automated commercial tender document (CTD) response generation, the method comprising:
   populating a database of a computer with different questions extracted from different past CTDs;
   clustering the different questions into groups of similar questions by natural language processing each of the different questions, grouping ones of the questions that are semantically similar, forming a genus question for each grouping of semantically similar questions;
   for each of the genus questions, mapping a set of answers submitted in respectively different responses by multiple different responders to different ones of the past CTDs in connection with the genus question;
   rating the responses in the database;
   loading into an editor in memory of the computer, a present response document for a present CTD and also the present CTD, and extracting a question from the present CTD;
   querying the database with the extracted question and retrieving in response, different ones of the mapped set of answers mapped to a genus question for the extracted question;
   inserting by the editor into the present response document in connection with the extracted question, one of different ones of the mapped set of answers having a highest rating amongst the mapped set of answers mapped to the genus question for extracted question;
   parsing the present response document to compute document metrics;
   comparing the document metrics of the present response document to model metrics associated with a known win outcome;
   identifying a threshold deficiency in one of the document metrics relative to the model metrics; and,
   displaying a prompt in the editor with the identified threshold deficiency.

2. The method of claim 1, further comprising:
   receiving as input in the editor, an indication of success of the present CTD; and,
   adjusting ratings in the database for each one of the mapped set of answers inserted into the present response document to reflect the indication of success.

3. The method of claim 1, further comprising:
   receiving as input outside of the editor, an indication of success of one of the mapped set of answers inserted into the present response document; and,
   adjusting corresponding ratings in the database for the one of the mapped set of answers inserted to reflect the indication of success.

4. The method of claim 2, wherein the indication of success is a win-loss metric indicating, for all of the past CTDs, a probability of success in winning a bid utilizing the one of the mapped set of answers.

5. A computer data processing system configured for crowdsourced answer selection for question-answer processing in automated commercial tender document (CTD) response generation, the system comprising:
   a host computing system comprising one or more computers, each with memory and at least one processor;
   a data store coupled to the computing system and storing therein a multiplicity of different CTDs received from over a computer communications network from different computing clients from different individuals, and also different questions extracted from different ones of the CTDs; and,
   an answer selection module comprising computer program instructions executing in the memory of the host computing system, the program instructions performing:
   clustering the different questions into groups of similar questions by natural language processing each of the different questions, grouping ones of the questions that are semantically similar, forming a genus question for each grouping of semantically similar questions;
   for each of the genus questions, mapping a set of answers submitted in respectively different responses by multiple different responders to different ones of the past CTDs in connection with the genus question;
   rating the responses in the data store;
   loading into an editor in the memory of the host computing system, a present response document for a present CTD and also the present CTD, and extracting a question from the present CTD;
   querying the data store with the extracted question and retrieving in response, different ones of the mapped set of answers mapped to a genus question for the extracted question;
   inserting by the editor into the present response document in connection with the extracted question, one of different ones of the mapped set of answers having a highest rating amongst the mapped set of answers mapped to the genus question for extracted question,
   parsing the present response document to compute document metrics;
   comparing the document metrics of the present response document to model metrics associated with a known win outcome;
   identifying a threshold deficiency in one of the document metrics relative to the model metrics; and,
   displaying a prompt in the editor with the identified threshold deficiency.

6. The system of claim 5, wherein the program instructions further perform:
   receiving as input in the editor, an indication of success of the present CTD; and,
   adjusting ratings in the database for each one of the mapped set of answers inserted into the present response document to reflect the indication of success.

7. The system of claim 5, wherein the program instructions further perform:
receiving as input outside of the editor, an indication of success of one of the mapped set of answers inserted into the present response document; and,
adjusting corresponding ratings in the database for the one of the mapped set of answers inserted to reflect the indication of success.

8. The system of claim 6, wherein the indication of success is a win-loss metric indicating, for all of the past CTDs, a probability of success in winning a bid utilizing the one of the mapped set of answers.

9. A computer program product for crowdsourced answer selection for question-answer processing in automated commercial tender document (CTD) response generation, the computer program product including a computer readable storage medium having program instructions embodied therewith, the program instructions executable by a device to cause the device to perform a method including:
populating a database of a computer with different questions extracted from different past CTDs;
clustering the different questions into groups of similar questions by natural language processing each of the different questions, grouping ones of the questions that are semantically similar, forming a genus question for each grouping of semantically similar questions;
for each of the genus questions, mapping a set of answers submitted in respectively different responses by multiple different responders to different ones of the past CTDs in connection with the genus question;
rating the responses in the database;
loading into an editor in memory of the computer, a present response document for a present CTD and also the present CTD, and extracting a question from the present CTD;
querying the database with the extracted question and retrieving in response, different ones of the mapped set of answers mapped to a genus question for the extracted question;
inserting by the editor into the present response document in connection with the extracted question, one of different ones of the mapped set of answers having a highest rating amongst the mapped set of answers mapped to the genus question for extracted question,
parsing the present response document to compute document metrics;
comparing the document metrics of the present response document to model metrics associated with a known win outcome;
identifying a threshold deficiency in one of the document metrics relative to the model metrics; and,
displaying a prompt in the editor with the identified threshold deficiency.

10. The computer program product of claim 9, wherein the method further comprises:
receiving as input in the editor, an indication of success of the present CTD; and,
adjusting ratings in the database for each one of the mapped set of answers inserted into the present response document to reflect the indication of success.

11. The computer program product of claim 9, wherein the method further comprises:
receiving as input outside of the editor, an indication of success of one of the mapped set of answers inserted into the present response document; and,
adjusting corresponding ratings in the database for the one of the mapped set of answers inserted to reflect the indication of success.

12. The computer program product of claim 10, wherein the indication of success is a win-loss metric indicating, for all of the past CTDs, a probability of success in winning a bid utilizing the one of the mapped set of answers.

* * * * *